J. E. BUSS.
LID LIFTER.
APPLICATION FILED MAR. 24, 1914.
1,137,949.
Patented May 4, 1915.
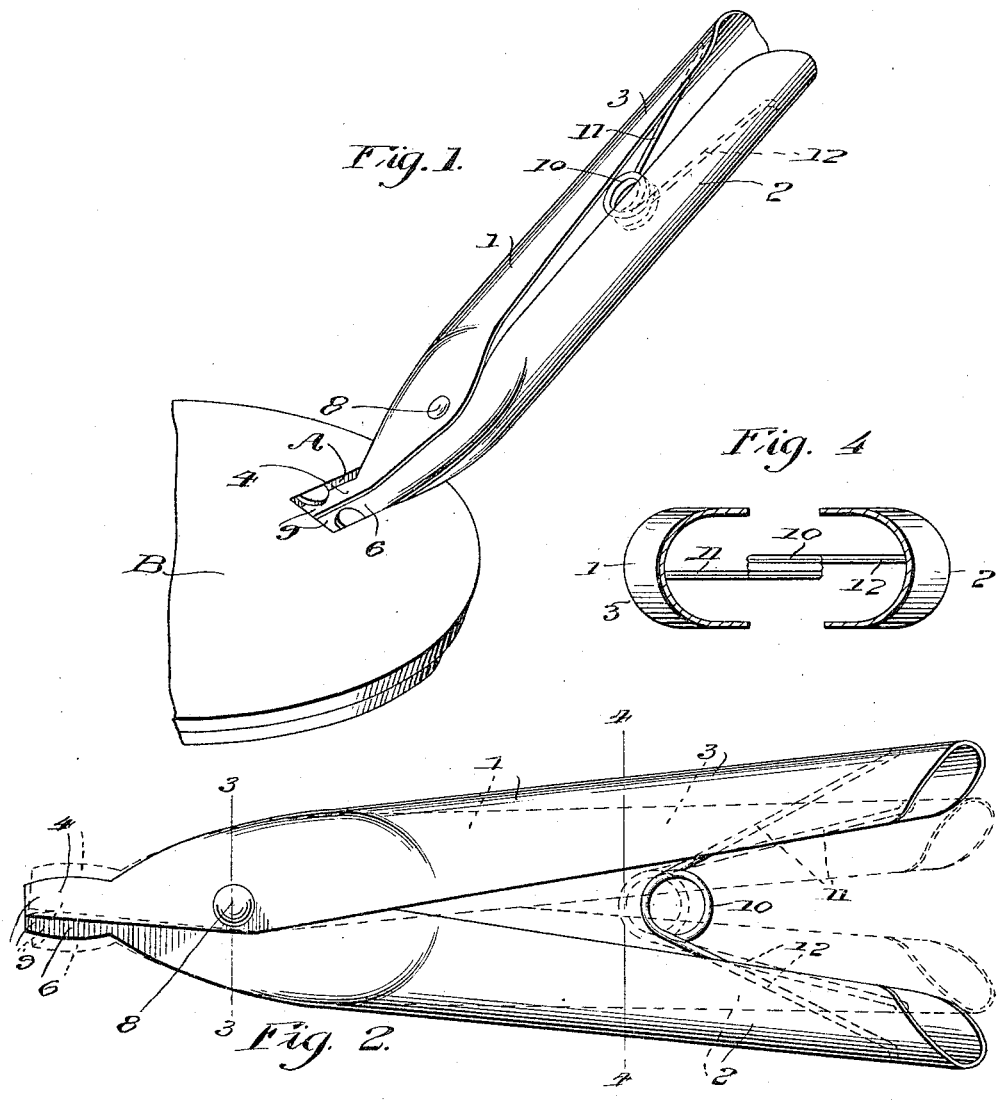

UNITED STATES PATENT OFFICE.

JOHN E. BUSS, OF WELLSBORO, PENNSYLVANIA.

LID-LIFTER.

1,137,949. Specification of Letters Patent. Patented May 4, 1915.

Application filed March 24, 1914. Serial No. 826,943.

*To all whom it may concern:*

Be it known that I, JOHN E. BUSS, a citizen of the United States, residing at Wellsboro, in the county of Tioga and State of Pennsylvania, have invented new and useful Improvements in Lid-Lifters, of which the following is a specification.

This invention relates to stove lid lifters; and it has for its primary object the provision of a lifter of this character which will consist of members having movable portions adapted to be extended into the recess of the lid and to be distended relatively therein and to properly accommodate themselves to the adjacent surface of the walls of the recess and thereby permit the lid to be connected with the lifter in a manner which will positively prevent the lid from being accidentally separated therefrom when the lid is lifted.

With these and other objects in view, the invention consists of certain novel features of construction, combination and arrangement of parts, as will be hereinafter described and claimed.

In the accompanying drawings:—Figure 1 is a perspective view of the lifter, showing its application to a portion of the lid; Fig. 2 is a plan view thereof, showing the effective lifting ends closed in full lines and opened in dotted lines; Fig. 3 is a section on the line 3 3 of Fig. 2; and Fig. 4 is a section on the line 4—4 of Fig. 2.

The lifter comprises mating sections, which are each formed from a single length of sheet metal. The member 1 is provided with a longitudinal handle 3 which is curved transversely and at the forward end the metal from which the handle is formed is offset and provided with spaced upper and lower portions 4 and 5, between which the similar portions 6 and 7 of the member 2 are extended. Through the portions 4, 5, 6 and 7 is passed a rivet 8, which is designed to permit the members 1 and 2 to be freely adjusted and to thereby cause the effective lifting ends 9 of the members 1 and 2 to be separated from each other and extended against the side walls of the recess A of the lid B. In this manner the said portions 9 will engage in the recess in a way which will prevent the accidental derangement of the lid, as the latter is lifted. The portion 9 of the member 1 has its portions 6 and 7 pressed directly against each other so as to be freely accommodated in the spaces 4 and 5 forming the part 9 of the adjacent member 2.

Located between the handles of the members 1 and 2 is a spring 10 having branches 11 and 12, which are respectively connected with the handles 1 and 2, so that under the action of the spring the effective lifting ends 9 of both members will be held normally closed as shown in full lines in Fig. 2. The lid may be used in the manner similar to the use of the well known lifter but to insure safety in conveying the lid from place to place, the handle end of the members 1 and 2 may be pressed toward each other and against the action of the spring 10, and as a consequence thereof, the ends 9 of the said members 1 and 2 will be adjusted away from each other, and they will be made to engage in the recess in a way which will positively prevent the separation of the lid from the lifter as will be understood.

I claim:—

The herein described stove lid lifter comprising a pair of members each having a substantially semi-tubular lever arm which is flattened to form a jaw comprising double webs, the webs which form one of the jaws being in mutual contact and those which form the other jaw being spaced apart, the first named jaw being permanently fitted between and partly overlapped by the webs of the last-named jaw and pivotally connected thereto, and a spring arranged between the arms of the members and having its ends connected thereto, said spring serving to normally open the jaws.

In testimony whereof I affix my signature in presence of two witnesses.

JOHN E. BUSS.

Witnesses:
BION WALBRIDGE,
W. B. RIFFLE.

Copies of this patent may be obtained for five cents each, by addressing the "Commissioner of Patents, Washington, D. C."